(12) United States Patent
Heshmat

(10) Patent No.: US 6,505,837 B1
(45) Date of Patent: Jan. 14, 2003

(54) COMPLIANT FOIL SEAL

(75) Inventor: Hooshang Heshmat, Niskayuna, NY (US)

(73) Assignee: Mohawk Innovative Technology, Inc., Albany, NY (US)

( * ) Notice: Subject to any disclaimer, the term of this patent is extended or adjusted under 35 U.S.C. 154(b) by 0 days.

(21) Appl. No.: 09/428,602

(22) Filed: Oct. 28, 1999

(51) Int. Cl.$^7$ ................................................ F01D 11/02
(52) U.S. Cl. ........................ 277/411; 277/422; 277/579; 277/581; 277/582
(58) Field of Search ................................. 277/411, 422, 277/543, 545, 548, 579, 581, 585; 384/106, 119, 140

(56) References Cited

U.S. PATENT DOCUMENTS

| | | | |
|---|---|---|---|
| 4,114,248 A | | 9/1978 | Smith et al. |
| 4,223,958 A | * | 9/1980 | Gray |
| 4,274,683 A | * | 6/1981 | Gray et al. |
| 4,300,806 A | * | 11/1981 | Heshmat |
| 4,415,280 A | * | 11/1983 | Agrawal |
| 4,415,281 A | * | 11/1983 | Agrawal |
| 4,465,384 A | * | 8/1984 | Heshmat et al. |
| 4,549,821 A | * | 10/1985 | Kawakami |
| 4,950,089 A | * | 8/1990 | Jones |
| 5,100,158 A | | 3/1992 | Gardner |
| 5,318,366 A | * | 6/1994 | Nadjafi |
| 5,370,402 A | | 12/1994 | Gardner et al. |
| 5,632,493 A | | 5/1997 | Gardner |
| 5,658,079 A | * | 8/1997 | Struziak et al. |
| 5,769,604 A | | 6/1998 | Gardner et al. |
| 5,833,369 A | | 11/1998 | Heshmat |
| 5,902,049 A | | 5/1999 | Heshmat |
| 5,988,885 A | * | 11/1999 | Heshmat |

OTHER PUBLICATIONS

R. Flower, "Brush Seal Development System," AIAA Paper 90–2143, AIAA/SAE/ASME/ASEE 26$^{th}$ Joint Propulsion Conference, Orlando, FL, Jul., 1990.

\* cited by examiner

Primary Examiner—Robert J. Sandy
Assistant Examiner—Vishal Patel
(74) Attorney, Agent, or Firm—James C. Simmons

(57) ABSTRACT

A compliant foil seal comprising at least one smooth resilient foil for facing a rotor and at least one bump foil for providing film riding stiffness and controlled deformation of the smooth resilient foil for providing an effective seal which is capable of operating reliably in the presence of large rotor excursions.

20 Claims, 5 Drawing Sheets

COMPLIANT FOIL SEAL

BACKGROUND OF THE INVENTION

The present invention relates generally to seals.

Advanced general aviation propulsion engines capable of operating efficiently and reliably on new aviation fuels while producing emission and noise levels lower than those of current propulsion systems are needed to expand the role of light, business, and personal transportation aircraft and to revitalize the U.S. general aviation industry. Lighter, smaller, more efficient, consistently high performance, and low maintenance engines which will deteriorate little over time due to component wear are required to meet the need. The higher pressure ratios, mass flow rates, and operating speeds and temperatures needed to meet these conditions will place severe constraints on bearing and seal systems My U.S. Pat. Nos. 5,833,369 and 5,902,049, which are incorporated herein by reference, disclose high load capacity thrust and journal bearings respectively for meeting the above need. The journal bearing comprises a smooth foil which is positioned to face the rotating shaft for relative motion therebetween by means of an air or gas or process fluid hydrodynamic film developed therebetween during such rotation. A corrugated sheet is disposed between the smooth foil and the bearing housing or sleeve for compliantly or resiliently supporting the smooth foil, i.e., bumps or ridges on the sheet deflect under load during shaft rotation or excursions. The elastic deflection of the sheet provided the clearance geometry required to generate the load-carrying hydrodynamic film. The thrust bearing comprises a smooth foil which faces a thrust runner and a corrugated sheet underlying the smooth foil for compliantly or resiliently supporting the smooth foil. Such hydrodynamic bearings are used in a wide variety of rotating machinery including, for example, air cycle machines, cryogenic turbo-expanders, and gas turbine engines.

Labyrinth seals, which use a series of teeth or blades in close proximity to a rotating shaft to break down pressure, allow high rates of gas leakage and are intolerant of rotor excursions and are thus insufficiently effective to meet the above need.

Noncontacting compliant hydrodynamic seals have been suggested to address the need for more robust long-life seals that can handle the expected temperatures, speeds, and pressure drops with low leakage during all facets of engine operation. See R. Flower, "Brush Seal Development Systems, AIAA Paper 90-2143, 1990. In early experiments, compliant foil seals have demonstrated lower leakage rates than labyrinth seals and even brush seals, without the wear limitations. However, brush seals undesirably rub during large rotor excursions at full operating speed and thus fail to achieve the needed performance and life benefits throughout the expected operating envelope.

U.S. Pat. Nos. 5,100,158; 5,370,402; and 5,632,493 disclose pressure balanced compliant seals which utilize fingers which are cantileverly attached to swing toward and away from the shaft. It is claimed in the '493 patent (column 7, lines 7 to 11) that the hydrodynamic forces caused by shaft rotation further increases film stiffness between each of the fingers and the shaft and that these hydrodynamic forces further enhance the ability of the fingers to dynamically track shaft motions due to runout and fast radial excursions. It is claimed that these seals can handle relatively large shaft excursions, e.g., 0.035 inch (See the '402 patent at column 8, lines 7 and 8). Such a cantilevered type spring seal is undesirably structurally complex, fragile, and has low hydrodynamic load capacity. The structural compliancy of this type of construction depends solely on the staggered cantilevered foils and their interaction with each other visa-vis friction. For a given design dimension (such a the fingers' length, width, thickness, etc.) there is stress limitation related to the levels of deflection one can impose upon such a cantilevered type foil, undesirably limiting the excursion capabilities of these seals. Moreover, the construction of this leaf (or finger) type seal undesirably interrupts the continuity of the hydrodynamic film, degrading appreciably the seal's hydrodynamic performance.

U.S. Pat. No. 4,114,248 relates to a method of making resiliently coated metallic finger seals. U.S. Pat. No. 5,769,604 relates to a rotary seal assembly wherein first and second members (one of which is a rotor and the other of which is a stator) have annular sealing faces with two sets of grooves (one radially inwardly of the other) in one of the sealing faces. Pressurized fluid flows between the sealing faces and within the grooves thereby forming a gas film seal between the sealing faces. This seal assembly is said to have high angular compliance. The seals of these patents are not able to handle as large of shaft excursions as desired.

SUMMARY OF THE INVENTION

It is accordingly an object of the present invention to provide a seal which is effective (provides a small clearance), has low wear, and is capable of operating reliably even in the presence of large rotor excursions.

In order to provide such a seal, in accordance with the present invention, a seal comprises at least one smooth resilient foil for facing a rotor and at least one bump foil (one having a series of undulations circumferentially thereabout) for providing stiffness and controlled deformation to the smooth foil.

The above and other objects, features, and advantages of the present invention will be apparent in the following detailed description of the preferred embodiment of the invention when read in conjunction with the appended drawings wherein the same reference numerals denote the same or similar parts throughout the several views.

DETAILED DESCRIPTION OF THE PREFERRED EMBODIMENT

Figure 1:
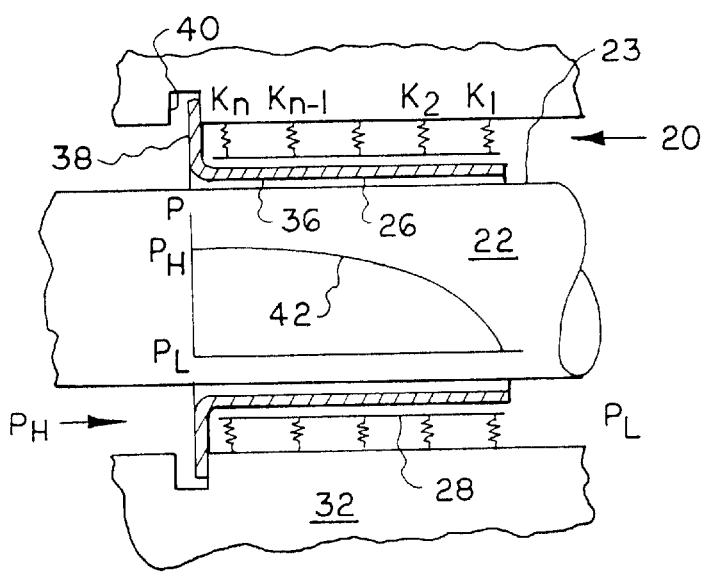
FIG. 1 is a longitudinal sectional view, partly schematic, of a seal which embodies the present invention.
Figure 2:
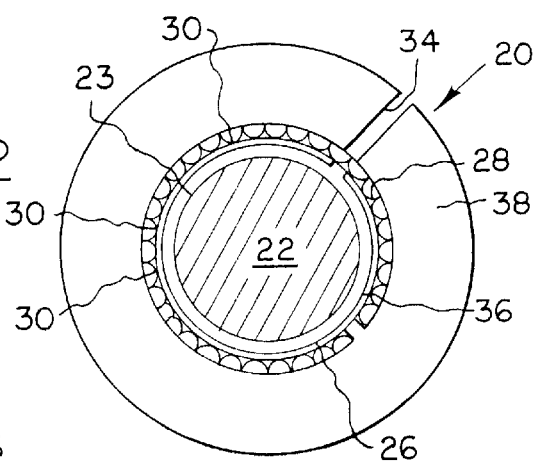
FIG. 2 is an end view thereof which, for ease of illustration, does not show the housing.

Referring to FIGS. 1 and 2, there is illustrated generally at 20 a seal for sealing along a rotating rotor 22 in a piece of machinery between a high pressure side PH and a low pressure side PL. The rotor rotates about a longitudinal axis, illustrated at 24, and the radial, circumferential, and axial directions, as used herein and in the claims, are defined, unless otherwise specified, with respect to this axis 24, i.e., the radial direction is defined as a direction toward or away from axis 24, the axial direction is defined as a direction along the axis 24 or a line parallel to the axis 24, and the circumferential direction is defined as a direction extending around the axis 24. The seal 20 thus seals along an axially extending circumferential surface 23 of the rotor 22 to seal axially of the rotor.

The seal 20 comprises a radially inner smooth resilient foil 26 which extends circumferentially around and faces the rotor 22 and a bump foil 28 which has a plurality of side-by-side bumps or undulations 30 each extending generally axially of the seal, the bump foil lying between the smooth foil 26 and a housing 32 for the seal to provide stiffness and controlled deformation to the smooth foil as discussed hereinafter. The smooth foil 26 is axially split, as illustrated at 34, to accommodate radial expansions. As used herein and in the claims, the term "rotor" is meant to include a runner (extension) on the rotor, such as provided for a journal or thrust bearing.

The smooth foil 26 comprises a circumferential portion 36 for facing the rotor 22 and a flange portion 38 at one end that extends radially outwardly or away from the rotor 22. The flange portion 38 is received within a narrow circumferential recess or slot, illustrated at 40, in the inner wall of the housing 32 to provide stabilization of the smooth foil 26. The flange portion 38 is loosely received in the recess 40 so as to allow some flexibility of movement of the smooth foil 26 both radially and axially so as to more easily achieve the desired resilience of the rotor facing portion 36 so that the smooth foil 26 (portion 36) compliantly faces the rotor 32 to maintain a desired small spacing therebetween to thereby effect sealing. By "compliantly" of a smooth foil is meant that the smooth foil (or rotor facing portion thereof) moves in conformity with excursions or radial growth or the like of the rotor during its rotation to maintain a desired small spacing therebetween. The flange portion 38 is anchored against rotation as discussed hereinafter relative to alternative embodiments.

Figure 6:
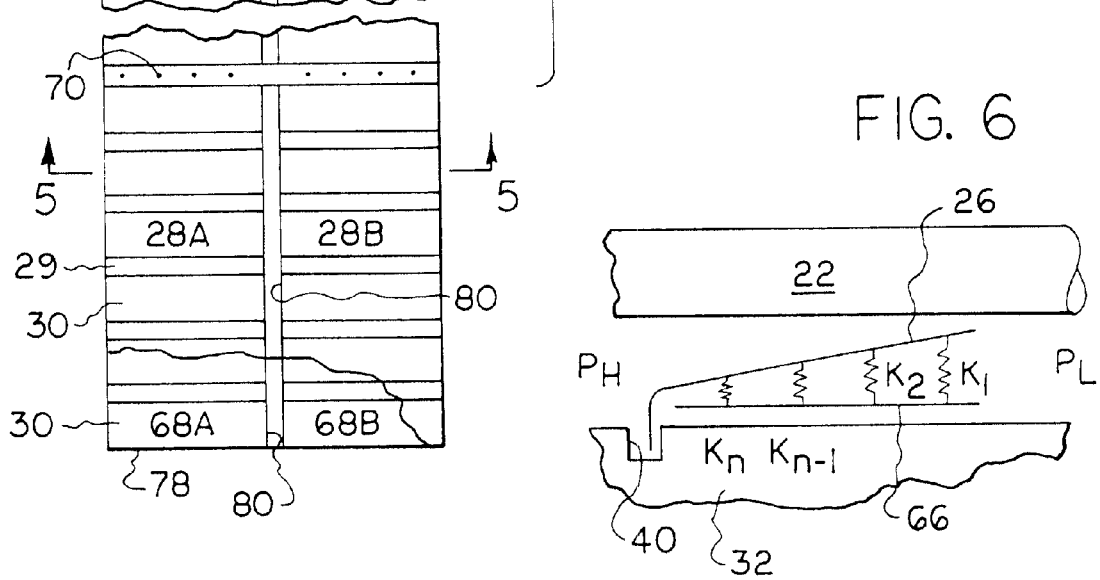
FIG. 6 is a diagrammic illustration (exaggerated for ease of illustration) for illustrating how the seal of the present invention seals.

Without wishing to be bound by theory here or elsewhere in this specification, it is believed that the forces of friction and the like will decrease the pressure over the axial length of the seal, as illustrated at 42, wherein in the graph the ordinate is a measure of pressure and the abscissa is the measure of axial length, so that the bump stiffness at the low pressure side is better able to act to close the gap between the smooth foil 26 and the rotor 22 in what may be called a "converging wedge", illustrated in FIG. 6 and which is discussed in greater detail hereinafter.

The bump stiffness K may vary along the axial direction to provide a more effective converging wedge, as discussed hereinafter with reference to FIGS. 4 to 6. However, it is not considered a requirement of the present invention that the bump stiffness K vary, and it may if desired remain constant in the axial direction. The bump stiffness may, if desired, also be varied in the circumferential direction to achieve stability and damping, using principles discussed in my aforesaid U.S. Pat. Nos. 5,833,369 and 5,902,049 and which can be applied using principles commonly known to those of ordinary skill in the art to which this invention pertains.

As discussed hereinafter, in order to enhance its effectiveness, a seal may contain other components in addition to those which have been described for seal 20.

Figure 3:
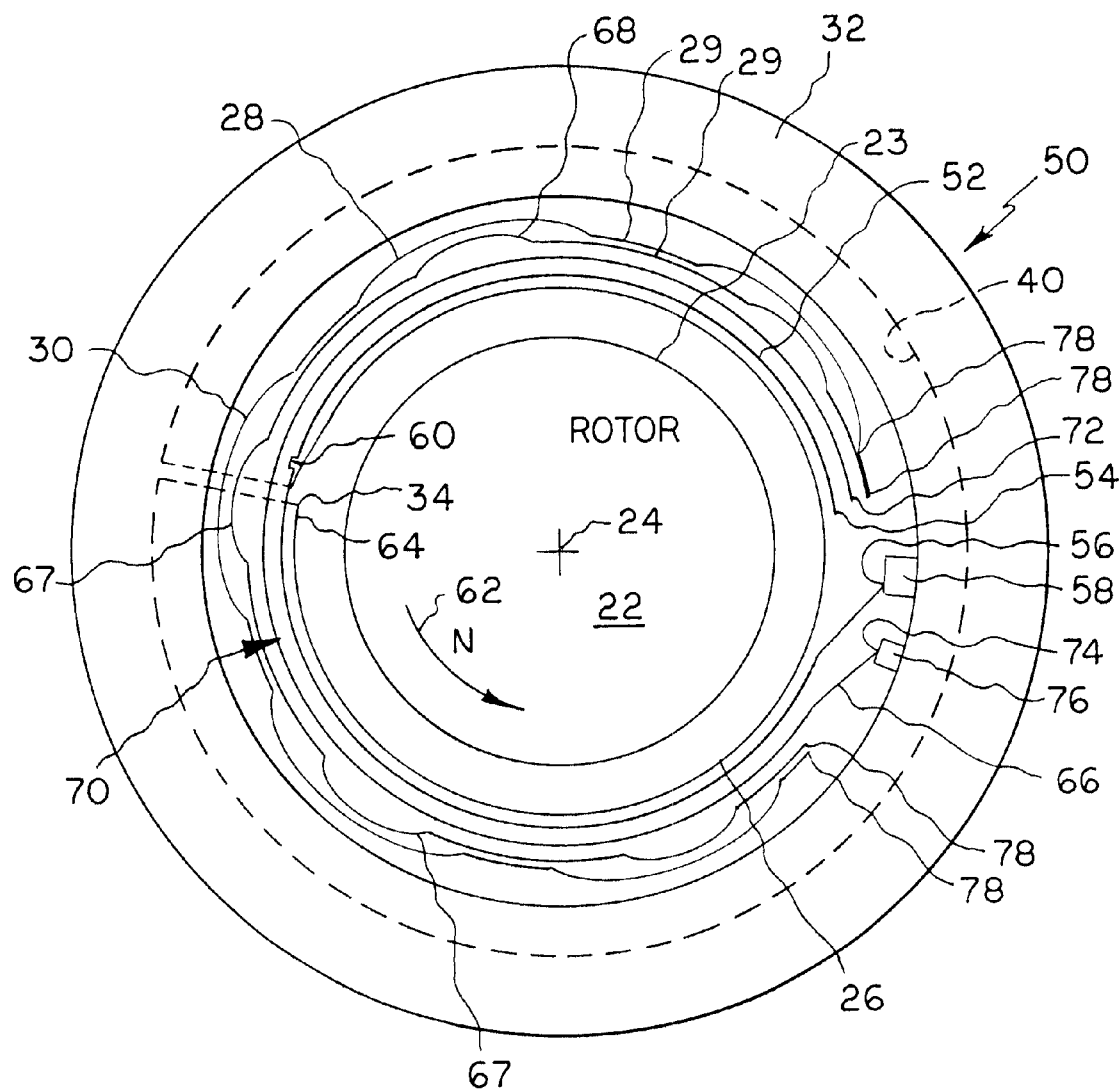
FIG. 3 is an end view, generally schematic, of an alternative embodiment of the seal and showing its attachment to a housing.

Referring to FIG. 3, there is illustrated generally at 50 a seal comprising a housing or cartridge 32 with a circumferential slot 40, smooth top foil 26 (facing the rotor 22), and a bump foil 28 similarly as illustrated for FIGS. 1 and 2. Seal 50 also comprises a smooth backing spring foil 52 which is adjacent and extends circumferentially about top foil 26. Backing foil 52 is also split axially, as illustrated by free edge 54, to accommodate radial expansions. The opposite edge 56 thereof is anchored to the housing 32 by spacer block 58 or by other suitable means, and the top foil 26 is tack welded adjacent the split 34 to the backing foil, as illustrated at 60, thereby to provide an anti-rotation means to the sealing elements. The rotation, illustrated at 62, of the rotor 22 is from the free edges 64 and 54 of the top and backing foils 26 and 52 respectively toward their respective fixed edges at 60 and 56 respectively. The backing spring foil 52 is provided to achieve preloading of the top foil 26 and to achieve sealing at the split 34.

Figure 4:
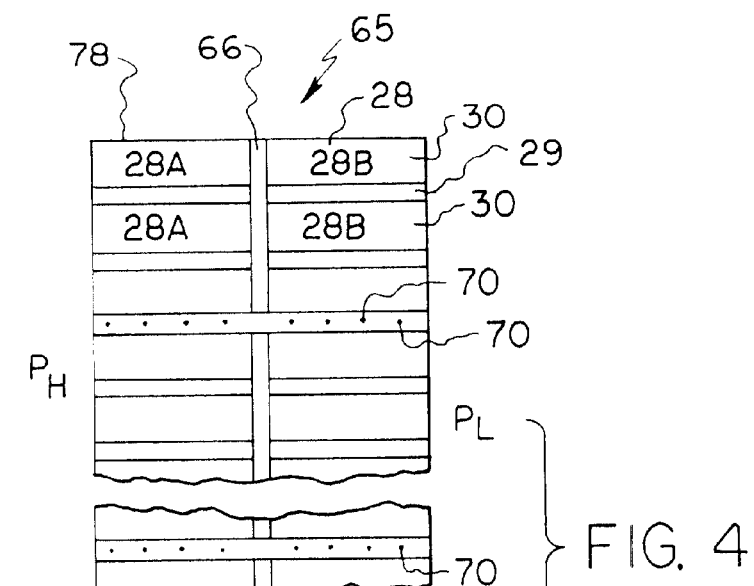
FIG. 4 is a generally schematic detailed plan view of the bump foil assembly thereof, when flat and before it is rolled into the circumferential shape for incorporation into the bearing.
Figure 10:
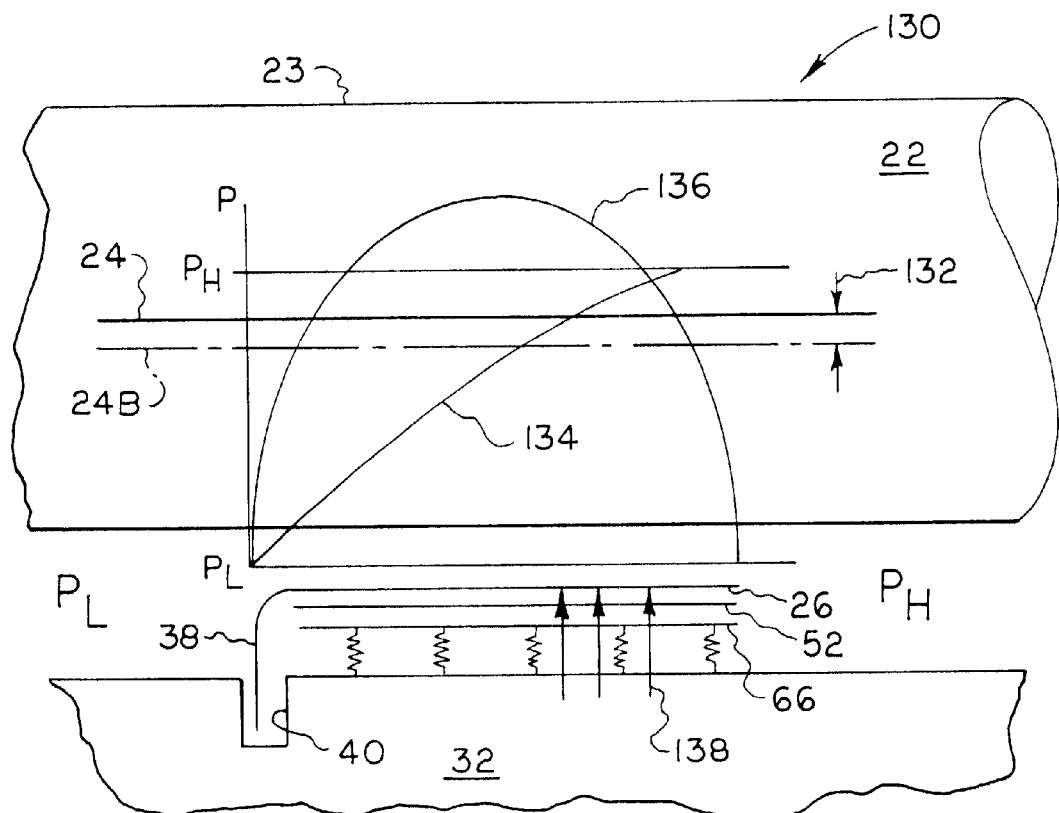
FIG. 10 a schematic view similar to that of FIG. 1 illustrating another alternative embodiment of the present invention.

Illustrated generally at 65 in FIG. 4 is an assembly of a smooth stiffener foil 66 to which bump foil 28 and an underlying second bump foil 68 (containing bumps 67 similarly as bumps 30 are contained by bump foil 28 and circumferentially spaced and separated by lands 29) are attached by suitable means such as a series of tack welds, illustrated at 70 in FIGS. 3 and 4, axially across the assembly in the lands 29 at a series of circumferentially spaced locations, for example, 3 locations, as illustrated in FIG. 4 (only one such location and a lesser number of bumps 30 shown in FIG. 3 as well as FIG. 10 for ease of illustration). The stiffener foil 66 is also axially split, as illustrated by its free axial edge 72, and its opposite axial edge 74 is anchored to the housing 32 by means of spacer block 76 or by other suitable means. The rotation 62 of the rotor 22 is from the free edge 72 of the stiffener foil 66 toward its fixed edge 74. As seen in FIG. 4, the locations of the tack welds 70 are spaced circumferentially from the axial edges, illustrated at 78, of the bump foils 28 and 68 thereby providing free axial edges to the bump foils. The bumps 68 are nested within bumps 28 to provide radially increased stiffness during increased loads (rotor excursions) thereon, as more fully discussed along with alternative embodiments of the bump foil assembly in my aforesaid U.S. Pat. Nos. 5,833,369 and 5,902,049. The axially split stiffener foil 66 and multi-layer bump foils 28 and 68 are provided to impart axial and radial as well as circumferential stiffness to the seal while controlling deformation of the rotor facing (sealing) surface of the top foil 26 during operation to achieve the desired sealing while maintaining rub-free operation.

As illustrated by bump foil edges 80 in FIG. 4, the bump foils 28 and 68 are split circumferentially to provide an axially inner row of bumps 28A and 68A facing the high pressure HP side and an axially outer row of bumps 28B and 68B facing the low pressure LP side. In order to increase the "converging wedge" effect illustrated in FIG. 6 for more effective sealing, the low pressure PL side bumps 28B and 68B are provided to be stiffer than the high pressure PH side bumps 28A and 68A. One way of providing such a stiffness increase is described hereinafter with reference to FIG. 5.

Figure 5:
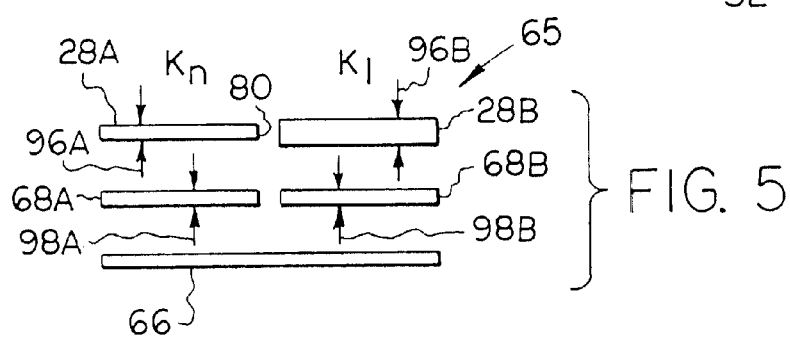
FIG. 5 is a sectional view taken along lines 5—5 of FIG. 4.

Referring to FIG. 5, in order to vary the stiffness of the assembly 66 over its axial length, the thickness of the material of which the bumps are made is varied. Thus, as illustrated in FIG. 5, the thickness, illustrated at 96A, of each of the bumps 28A is less than the thickness, illustrated at 96B, of each of the adjacent bumps 28B. The bump thickness is related to the bump stiffness. Thus, as the bump thickness increases from the high to the low pressure sides, the bump stiffness increases from the high to the low pressure sides. In accordance with the present invention, there may be more than two sets of bumps of increasing stiffness from the high to the low pressure sides. Thus, in FIG. 6, the bump stiffness Kn is least next to the high pressure side and increases toward the low pressure side from Kn to Kn−1 to K2 to K1 corresponding to the increasing bump thicknesses. The greater stiffness K1 at the low pressure side where the effects of friction and the like already act toward retarding the pressure are believed to enhance the "converging wedge" effect for even more effective sealing. It should be understood that other suitable means, such as, for example, by varying bump pitch, radius, or height or otherwise varying bump configuration, may be provided for varying the bump stiffness, and such other means are meant to come within the scope of the present invention.

Figure 7:
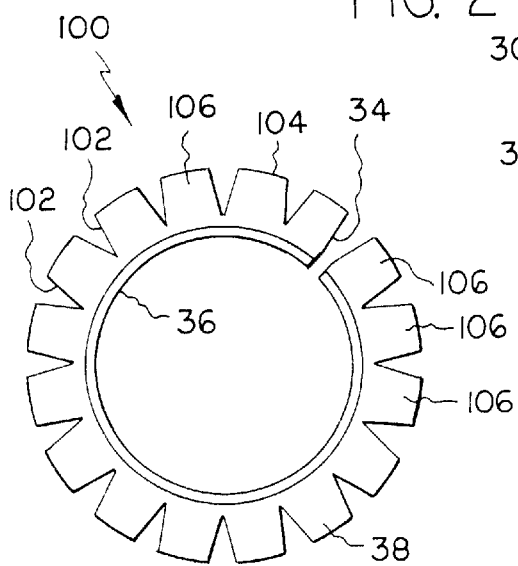
FIG. 7 is an end view of a first smooth foil for a seal in accordance with an alternative embodiment of the present invention.

Referring to FIG. 7, there is illustrated generally at 100 a preferred embodiment of a smooth top foil. In order to decouple the flange 38 from the circumferential portion 36 so that the circumferential portion 36 provides a more compliant surface, a plurality of slits or cut-outs, illustrated at 102, are provided in the flange 38 to extend radially across the flange 38 from the flange edge 104 to the circumferential portion 36 to "soften up" the foil 100 at the intersection of the flange 38 with the circumferential portion 36. These cut-outs 102 also allows low cost single piece construction of the top foil (as well as the backing foil discussed hereinafter). These cut-outs 102 form a plurality of radially-extending finger portions 106 disposed about the circumference of the foil 100.

Figure 8:
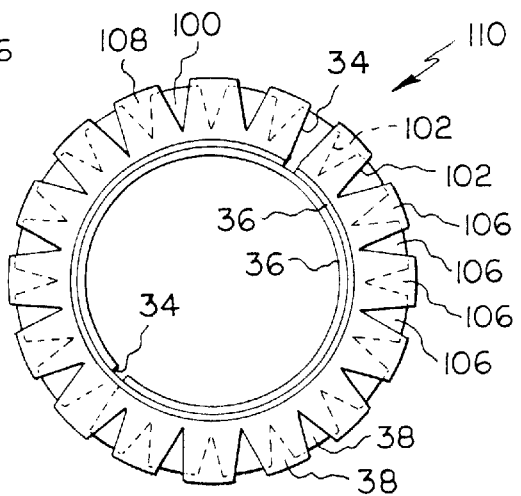
FIG. 8 is tan end view of an assembly of the first smooth foil and a second smooth foil for the seal.

In order to seal against pressure passing through the slits 102 as well as at the split 34, a backing smooth foil 108 is preferably provided to also have a flange 38 and finger portions 106. Referring to FIG. 8, the smooth foils 100 and 108 are disposed relative to each other in an assembly, illustrated at 110, wherein the finger portions 106 of each foil cover the cut-outs 102 of the other foil and wherein the split 34 of each foil is offset from the split 34 of the other foil. In addition, the frictional interaction between the two foils 100 and 108 during operation provides frictional damping to the foils 100 and 108 to thus stabilize any undesired vibration problems.

Figure 9:
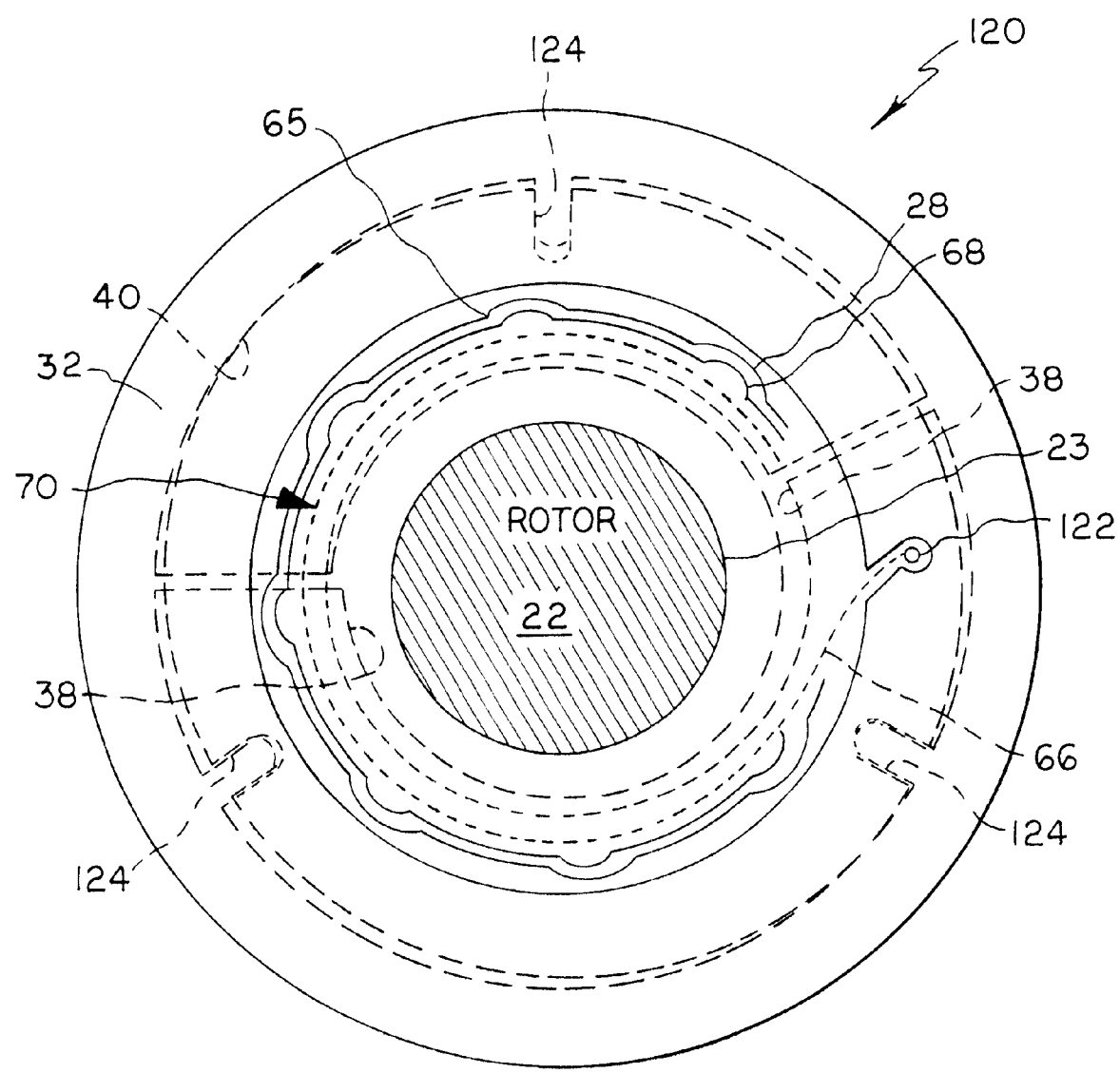
FIG. 9 a view similar to that of FIG. 3 of a seal incorporating the smooth foils of FIG. 8.

Referring to FIG. 9, there is illustrated generally at 120 a preferred embodiment of the seal wherein a bump assembly 65 is assembled with the smooth foil assembly 110 and the stiffener foil 66 anchored to the housing 32 as at 122. The smooth foil flanges 38 are received loosely in housing recess to allow radial and axial movement of the circumferential portions 36 for increased compliancy and are held against rotation by anti-rotation slots, illustrated at 124, or by other suitable means. For example, anti-rotation may be alternatively provided by tack welding a finger portion 106 of one smooth foil to a finger portion 106 of the other smooth foil and to the housing 32. For another example, anti-rotation may be provided by pins.

The smooth foils 26 and 52 (including foils 100 and 108), the stiffening foil 66, and the bump foils 28 and 68 are desirably composed of metal such as, for example, nickel-based steel or a beryllium-copper or beryllium-bronze alloy (or, for some applications, thermoplastic material) which is fatigue-resistant, has good spring properties, and has strong mechanical strength. The top foil may, for another example, be composed of multi-layer composite material providing good internal damping. In order that the bearing be capable of operation at extremely high environmental temperatures (as high as about 1300 degrees F.), the foils are preferably made from the most super alloys such as, for example, Ni-based metals, Rene or Inconel sheets, and other suitable alloys which allow the foils to withstand such high temperatures. Each of the foils may be thin, i.e., the thickness of each of the foils may, for example, be on the order of 0.004 to 0.011 inch, to provide a seal which is both compact and lightweight. If the top foil is too thin, it may have insufficient structural integrity to prevent its buckling due to friction forces during start-up and shut-down. If the top foil is too thick, the increased rigidity may adversely affect the spatial compliancy and hence hydrodynamic performance of the seal. It may be necessary to perform finite element analysis (which can be conventionally performed by those of ordinary skill in the art to which this invention pertains) on the top foil to ensure that the correct thickness thereof is established for a particular application. An example of a suitable top foil thickness for a certain size seal is contained in the example which is provided hereinafter. The smooth foils 100 and 108 (as well as foils 26 and 52) may be formed between male and female dies with pressure applied to the male die, or by any other suitable process.

Suitable coatings may be applied as discussed in my aforesaid patents. For example, a hard sputtered coating may be applied to the top foil and a plasma spray coating to the rotor. For another example, for low temperature (less than about 350 degrees F.) applications, a suitable thin Teflon-based lubricous dry film may be applied to the surfaces of the top foil 26 in order to reduce startup and shutdown wear at interfaces of the foil 26 and rotor 22 and to minimize friction between the top foil flange 38 and the surfaces of the recess 40, and a hard coating applied to the rotor. For another example, in high temperature applications, the top foil may be uncoated or have a coating such as sputtered aluminum oxide applied, while the rotor may be coated with a high temperature lubricious material such as a coating known as PS304 developed by NASA/LeRC.

The following example is for exemplary purposes only and not for purposes of limitation. While the seal of the present invention may be of various sizes for various size rotors, a seal for a rotor having a diameter on the order of 1½ inch may have a length axially of around ¾ to 1 inch and a bump foil assembly length axially of about ½ inch. The circumferential slot may have a depth of about ½ inch for receiving the smooth foil flanges. The operating gap between the rotor and the top foil may, for example, be about 300 micro-inch. Bump thicknesses 96A and 96B may, for example, be about 0.005 inch and 0.007 inch respectively. The thicknesses, illustrated at 98A and 98B, of bumps 68A and 68B respectively may be, for example, about 0.006 inch and 0.008 inch respectively. The thicknesses of the top foil, backing foil, and stiffening foil are, for example, about 0.006 inch, 0.006 inch, and 0.007 inch respectively.

Referring to FIG. 10, there is illustrated generally at 130 an alternative embodiment of the present invention wherein the flange 38 of the top foil 26 is adjacent the low pressure side PL. In FIG. 10, the rotor 22 is assumed to be eccentric with shaft excursions between axial positions 24 (shown position) and 24B (in phantom lines for position after excursion), illustrated at 132, of about 20 mils. In the graph of pressure along the ordinate and distance axially along the bearing along the abscissa, there are shown at 134 and 136 respectively plots of assumed sealing and hydrodynamic pressure distributions. As can be seen from FIG. 10, hydrodynamic pressure plus axial pressure should be balanced against high pressure PH acting on the underside of the top foil 26, i.e., as illustrated at 138. It is believed that a diverging wedge will also be created for effective sealing with this embodiment. It is thus believed that it may be said that the seal of the present invention acts bidirectionally.

The corrugated bumps 30 are provided under the top foil in order to provide a spatially variable stiffness and to encourage lobing of the top foil. The resulting top foil curvature with respect to the shaft provides lift and shaft/seal separation through hydrodynamic pressure profiles. These pressures may result from the inherent formation of a circumferential converging wedge clearance between the shaft and the top foil under the influence of dynamic relative shaft-seal motions. When the rotor is not spinning or is at very low speed and the change in pressure (PH-PL) is near zero, partial contact or zero clearance is prevalent and the smooth extensible top foil wraps itself around the rotor. As the rotor speed increases, a thin gaseous film is quickly generated which separates the rotor and the top foil to form the converging wedge. As speed or rotor excursions increase or the change in pressure (PH-PL) increases, the top foil is automatically forced radially outwardly, but the spatially variable stiffness provided by the bumps causes the top foil to lobe and form a converging wedge. As hydrodynamic or hydrostatic (PH-PL) pressures increase (due to increased speed, rotor expansion, rotor excursion, or sealing pressure), the second series of bumps in foil 68 provide increased stiffness as needed to maintain the converging wedge in the axial direction as well as in the circumferential direction. By providing an axial stiffness gradient by splitting the bump strips axially, i.e., along split line 80 in FIG. 4, the optimum film thickness over the entire seal axial length under axial misalignment or shaft bending may be maintained. Without this capability, edge loading may occur resulting in reduced load capacity and in localized wear of the seal lubricant coating. The bump stiffness should be such that the hydrodynamic lift is sufficient to separate the shaft and top foil at as low a speed as possible to minimize the start-up and shut-down wear and prolong life. The spatially variable stiffness must also be able to maintain the desired minimum clearance at the full operating speed and differential pressure. By varying the stiffness profile in accordance with the above principles, a seal may be tailored to nearly always maintain its optimal configuration regardless of the operating conditions. The bump foil arrangement thus enables a surface to be established that will form the optimum global lobing and localized convergence without the precision machining that would be required for a fixed geometry configuration. Besides high load capacity, the motion between the bump foil layers and smooth foils during rotor excursions introduce frictional damping resulting in a greater stabilizing influence being produced for the rotor system. Thus, more stabilizing forces may desirably be produced as rotor speed or excursions increase. A suitable stiffness profile can be determined using principles commonly known to those of ordinary skill in the art to which this invention pertains.

Since the continuous top foil 26 is split and has a free edge, it is circumferentially extensible to allow it to accommodate excursions as discussed herein. The dynamic action of the bumps is provided to achieve the compliant action of the seal of the present invention so as to accommodate larger rotor excursion (as high as 25 to 50 mils) than, for example, seals wherein the compliant action is based on cantilever action.

Figure 11:
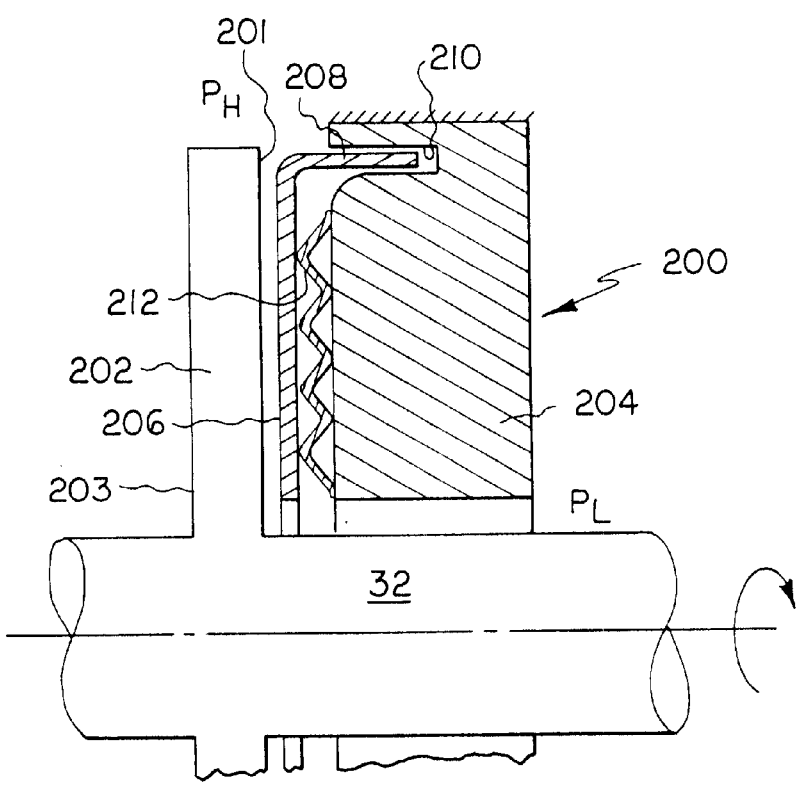
FIG. 11 is a partially schematic half sectional view of a seal in accordance with an alternative embodiment of the present invention, the other half thereof being identical to that shown.

Referring to FIG. 11, there is illustrated generally at 200 a seal in accordance with an alternative embodiment of the present invention. The seal 200 is provided for sealing radial differential pressure (PH-PL) along a thrust bearing runner or rotating disk 202 of rotor 32. The seal 200 is thus provided to extend circumferentially around the rotor 22 and radially along a radially extending surface 201 of a thrust runner portion of the rotor 22 to effect sealing radially of the rotor 22. While not shown in FIG. 11, it should be understood that a similar seal may be provided on the opposite side of the runner 202 to extend radially along opposite runner surface 203.

The seal 200 comprises a housing 204 in the form of a disk which extends circumferentially around the rotor 32, one or more radially split or slitted smooth foils, illustrated collectively at 206, which are in the form of disks which extend circumferentially about the rotor 32 and have radially outer flange portions 208 which are received loosely in circumferential slot, illustrated at 210, in housing 204 to anchor and allow movement thereof axially to compliantly engage thrust runner 202 similarly as discussed for seals 20, 50, 120, and 130, the smooth foil nearest the runner 202 being provided to achieve the hydrodynamic effect as previously discussed with respect to seals 20, 50, 120, and 130. The flange portions 208 may be axially slitted for ease of forming, and fluid leakage through the slits may be minimized by indexing two or more smooth foils 206 relative to each other similarly as discussed for seals 50, 120, and 130. One or more radially split or slitted bump foils, collectively illustrated at 212, in the form of disks which extend circumferentially about rotor 32, lie between the housing 204 and the smooth foil or foils 206 to provide compliancy of the seal 200, similarly as discussed for seals 20, 50, 120, and 130, but in the axial direction to accommodate axial excursions of the rotor 32. The bump foils 212 may be provided with variable stiffness, in accordance with the principles previously discussed with respect to seals 20, 50, 120, and 130, in the circumferential, radial, and axial directions to provide a converging wedge in two directions as well as compliancy in the axial direction, i.e., in the radial direction to provide an optimum converging wedge for sealing, in the circumferential direction to provide optimum hydrodynamic lift, and in the axial direction to establish optimum conformity with respect to the runner 202 for handling the runner's deformation and axial excursions. The smooth foils 206 may be arranged as sector pads, similarly as illustrated for bearing sector pads in my aforesaid U.S. Pat. No. 5,833,369, for providing hydrodynamic lift for particular operational conditions when there is no hydrostatic pressure (PH-PL) during start-up and shut-down operation, although alternative suitable means may be employed to achieve the same objective. Except as described above, the seal 200 is otherwise similar to seals 20, 50, 120, and 130 and utilize the same principles, which may be applied using principles commonly known to those of ordinary skill in the art to which this invention pertains.

In addition to its tolerance of large rotor excursions, misalignment, and centrifugal and thermal growth, a seal in accordance with the present invention is provided to have the advantages of essentially zero wear for long life due to its non-contacting hydrodynamic action, low leakage losses with improved specific fuel consumption/range due to its very small operating clearance, high temperature capability (up to about 1300 degrees F. if the foils are composed of the super alloy materials as previously discussed), high load capacity, and improved rotor system dynamics and stability due to its distributed stiffness and damping.

It should be understood that, while the present invention been described in detail herein, the invention can be embodied otherwise without departing from the principles of, and such other embodiments are meant to come within cope of the present invention as defined by the appended claims.

What is claimed is:

1. A combination of seal and housing, said housing having a circumferentially extending slot, a smooth resilient foil having a first portion shaped for extending circumferentially about a rotor over a distance axially of the rotor and a second portion comprising a flange which extends radially outwardly from one end axially of said first portion for extending circumferentially about the rotor and which engages said circumferentially extending slot, and at least one foil element having a corrugated shape to define a plurality of ridges for bearing against said smooth resilient foil, said foil element disposed between said first portion of said smooth resilient foil and said housing for resiliently supporting said smooth resilient foil to compliantly face the rotor.

2. A combination of seal and housing comprising, said according to claim 1 wherein said foil element has a pair of axially spaced ends and has a stiffness which increases from one to the other of said ends thereof.

3. A combination of seal and housing comprising, said according to claim 1 further comprising at least one other smooth resilient foil in contact with said a smooth resilient foil.

4. A combination of seal and housing according to claim 1 wherein said flange is movable radially within the slot.

5. A combination of seal and housing according to claim 1 wherein said smooth resilient foil is split axially for accommodating said smooth resilient foil to compliantly face the rotor.

6. A combination of seal and housing according to claim 1 wherein said smooth resilient foil and said foil element are composed of materials which allow the seal to operate at a temperature of about 1300 degrees F.

7. A combination of seal and housing according to claim 1 comprising at least two of said foil element each having a different stiffness.

8. A combination of seal and housing according to claim 1 comprising at least two of said foil element, wherein corrugations of one of said foil elements are nested within corrugations of an other of said foil elements to provide variable stiffness.

9. A combination of seal and housing comprising, at least two smooth resilient foils each having a first portion shaped for extending circumferentially about a rotor over a distance axially of the rotor and a second portion comprising a flange which extends radially outwardly from one end axially of said first portion for extending circumferentially about the rotor, a circumferentially extending slot in said housing in which said flanges are received, means in each said flange defining a plurality of flange portions separated by a plurality of radially extending slits, said foils being disposed so that each of the slits of each of said foils is covered by one of said flange portions of an other of said foils, and at least one element having a corrugated shape disposed between said first portions of said smooth resilient foils and said housing for resiliently supporting said smooth resilient foils to compliantly face the rotor.

10. A combination of seal and housing according to claim 9 wherein said at least one element comprises foil having said corrugated shape to define a plurality of ridges for bearing against said smooth resilient foils.

11. A combination of seal and housing according to claim 1 wherein said flanges are movable radially within said slot.

12. A combination of seal and housing according to claim 1 further comprising means defining a split in each of said smooth resilient foils.

13. A combination of seal and housing according to claim 12 wherein said smooth resilient foils are disposed so that said split means of said smooth resilient foils is offset from said split means in an other of said smooth resilient foils.

14. A combination of seal and housing according to claim 9 wherein said element has a pair of axially spaced ends and has a stiffness which increases from one to the other of said ends thereof.

15. A combination of seal and housing comprising, at least one smooth resilient foil having at least a portion thereof which is shaped for extending circumferentially about a rotor over a distance axially of the rotor between a pair of ends of said smooth resilient foil portion and at least one foil element having a corrugated shape to define a plurality of ridges and disposed between said smooth resilient foil portion and said housing for resiliently supporting said smooth resilient foil portion to compliantly face the rotor, said foil element having a pair of axially spaced ends and a stiffness which increases from one to an other of said ends thereof, and one of said ends of said smooth resilient foil portion is engaged over the circumference thereof to said housing to effect sealing between opposite sides axially of the seal.

16. A combination of seal and housing according to claim 15 wherein said smooth resilient foil comprises a flange portion which extends radially outwardly from said one end thereof and said housing has a circumferentially extending slot in which said flange portion is received for effecting the engagement of said smooth resilient foil portion to said housing.

17. A combination of seal and housing according to claim 16 wherein said flange portion is movable radially within the slot.

18. A combination of seal and housing according to claim 15 wherein said smooth resilient foil is split axially for accommodating said smooth resilient foil portion to compliantly face the rotor.

19. A combination of seal and housing comprising, said housing having a circumferentially extending slot, at least one smooth resilient foil having a first portion shaped for extending distance to engage a runner of the rotor and a second portion comprising a flange which extends axially from a radially outer end of said first portion for extending circumferentially about the rotor and which engages said circumferentially extending slot, and at least one foil element having a corrugated shape to define a plurality of ridges for bearing against said smooth resilient foil, said foil element disposed between said first portion of said smooth resilient foil and said housing for resiliently supporting said smooth resilient foil to compliantly face the rotor runner.

20. A combination of seal and housing according to claim 19 wherein said foil element has a pair of radially spaced ends and has a stiffness which increases from one to the other of said ends thereof.

* * * * *

UNITED STATES PATENT AND TRADEMARK OFFICE
CERTIFICATE OF CORRECTION

PATENT NO. : 6,505,837 B1
DATED : January 14, 2003
INVENTOR(S) : Hooshang Heshmat It is certified that error appears in the above-identified patent and that said Letters Patent is hereby corrected as shown below:

<u>Column 10,</u>
Line 14, after "means", -- in one -- should be inserted.
Line 52, after "extending", -- circumferentially about a rotor and radially of the rotor over a -- should be inserted.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,505,837 B1
DATED        : January 14, 2003
INVENTOR(S)  : Hooshang Heshmat It is certified that error appears in the above-identified patent and that said Letters Patent is hereby corrected as shown below:

Column 9,
Lines 28 and 32, "comprising, said" should be deleted.

Column 10,
Lines 8 and 10, "1" should read -- 9 --.
Line 14, after "means", -- in one -- should be inserted.
Line 52, after "extending", -- circumferentially about a rotor and radially of the rotor over a -- should be inserted.

Signed and Sealed this

Nineteenth Day of August, 2003

JAMES E. ROGAN
*Director of the United States Patent and Trademark Office*